Oct. 6, 1959 A. J. GALE 2,907,884
COMPACT NEUTRON SOURCE
Filed June 14, 1955 5 Sheets-Sheet 2

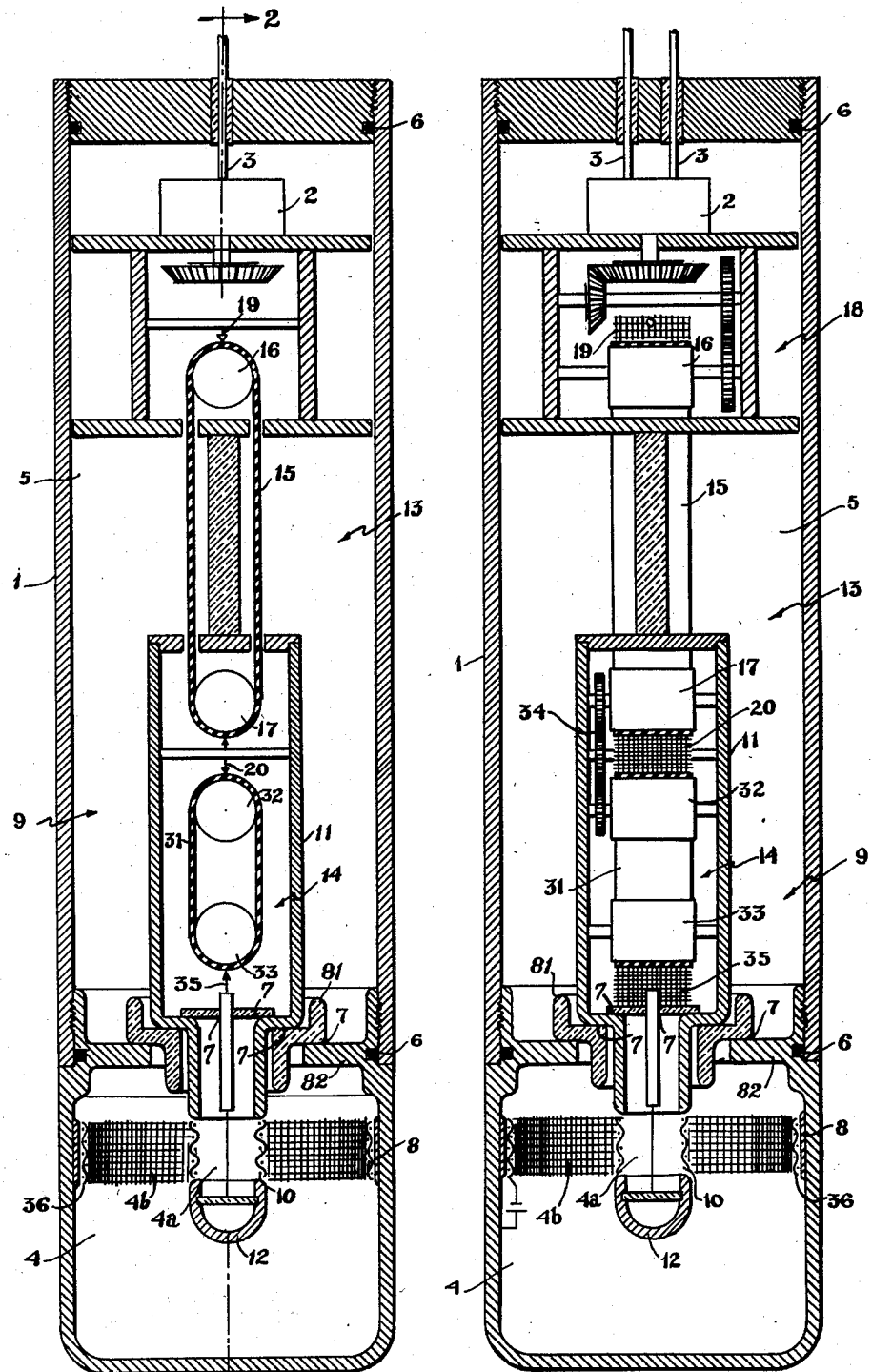

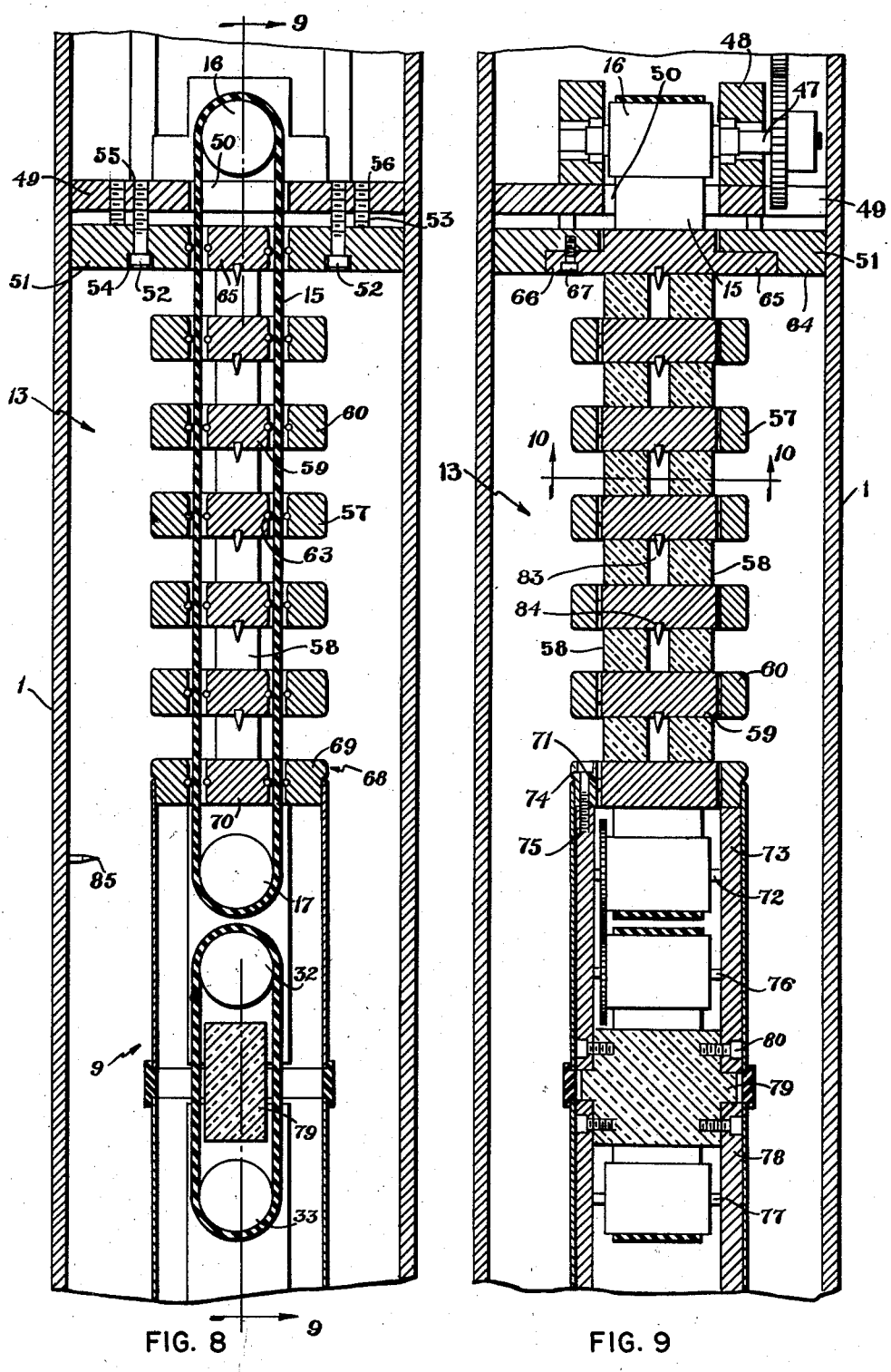

United States Patent Office 2,907,884
Patented Oct. 6, 1959

2,907,884
COMPACT NEUTRON SOURCE

Alfred J. Gale, Lexington, Mass., assignor to High Voltage Engineering Corporation, Cambridge, Mass., a corporation of Massachusetts Application June 14, 1955, Serial No. 515,435

21 Claims. (Cl. 250—84.5)

This invention relates to artificial neutron sources, and in particular to a compact ion accelerator of the static-atmosphere type, together with its associated target.

Compact neutron sources are particularly needed in the field of neutron well-logging, in which the dimensions of the source of neutrons must be sufficiently small so that it can be lowered down a borehole of limited lateral dimensions, often five inches in diameter or less. In radioactivity well-logging, the largest housing commonly used at the present time to enclose the logging equipment which is lowered into the borehole has an outside diameter of 3⅝ inches. Moreover, a neutron source for well-logging must be capable of withstanding the high temperatures and pressures that exist in the lower regions of the borehole. Temperatures up to 300° F. and higher are encountered, and the boreholes may be more than 15,000 ft. deep and filled with water and drilling fluid. Furthermore, the instrument must be capable of remote operation, with limited power of perhaps 40 watts supplied from the surface through the logging cable. In addition, the instrument must be mechanically rigid so as to withstand accelerations of perhaps as much as 50 G.

In radioactivity well-logging it is conventional to bombard the formations of the earth surrounding a well with neutrons and to record as a function of depth the neutrons scattered by the formations or gamma rays produced in the formations by the bombarding neutrons. The conventional source of neutrons used in well-logging is a mixture of radium and beryllium. Although use of such a source permits satisfactory logging, better logs could be made were the characteristics of the source different. The large number of gamma rays emitted by a radium-beryllium source produces a large gamma-ray background radiation which may obscure the gamma rays produced by the neutrons in the formations; a source which emits few or no gamma rays is desirable. The intensity of the radiation from a conventional source is about as high as is economically permissible and it is as high as safety requirements will permit, also a source of neutrons higher in energy than those from a conventional source would permit neutrons to travel farther from the source than do those from a conventional source, and the higher energy neutrons would excite excitation levels that cannot be excited by neutrons from a conventional source. For measuring formation properties by analysis of the energy spectrum of neutrons returning from the formations it is desirable that the irradiating neutrons be nearly monoenergetic which is not so in the case of the conventional source. There are some measurements which can only be made if the source can be pulsed or turned off at will; a neutron source that can be turned off may be used safely for a higher intensity bombardment than weaker sources, since the source can be turned off when on the surface and can be turned on when down the well.

In an artificial neutron source, neutrons are produced by bombarding a suitable target with positive ions which are accelerated to high energy in an electric field between a high-voltage electrode and the target. In a nuetron source of limited lateral dimensions, the voltage of the high-voltage electrode is limited by the space required for adequate insulation, and so the nuclear reaction employed must be one of those in which an adequate supply of substantially monoenergetic neutrons of relatively high energy are efficiently produced by bombarding a target with positive ions of relatively moderate energy. In radioactivity well-logging, the remoteness of the neutron source from the external power supply imposes severe limitations on the available power, and so the efficiency of the nuclear reaction employed is of prime importance.

Suitable nuclear reactions include the d, T; the t, D; the d, D; the d, Li; and the d, Be reactions. Of these reactions, the deuterium-tritium reactions are preferred, since they are the most efficient and provide neutrons having the most energy; and of the two deuterium-tritium reactions, the d, T reaction is preferred to the t, D reaction, since for a given accelerating voltage deuterons may be given a greater velocity than tritons. The kinetic energy of the bombarding deuteron together with 17.6 mev. reaction energy is divided between the resulting neutron and alpha particle, the energy of the neutron being approximately 14 mev. The reaction cross-section depends upon the energy given the deuterons, with the most favorable energy being approximately 100 kev. for a thin target. The most favorable energy increases as the thickness of the target increases, since additional energy is required to penetrate the thicker target.

Such a deuterium-tritium reactor avoids the above-mentioned difficulties encountered with the conventional radium-beryllium source of neutrons. There are no gamma rays produced by the deuterium-tritium reaction, although, of course, gamma rays may be produced by other unavoidable reactions in the reactor since deuterium and tritium are not the only materials present. At least the principal reaction is gamma-rayless. The intensity of the radiation may be made much larger than that from conventional sources for it is limited only by the current capacity of the reactor. Safety is no problem for the reactor may be turned off by turning off the accelerating voltage, whenever it is necessary for personnel to approach the reactor. The 14 mev. neutrons from the deuterium-tritium reactors are several times as energetic as the average neutrons from the conventional source. The neutrons from the deuterium-tritium reactor are very nearly monoenergetic varying only to the extent of about 0.5 mev. due to the ballistics of the reaction, the variation depending on the energy of the incident particles. The deuterium-tritium reactor can be pulsed and turned off at will by turning off the voltage which is used to accelerate or to produce the bombarding ions.

A compact neutron source for remote operation in a borehole should be of the static-atmosphere type, wherein the region in which the ions are created is in open communication with that in which they are accelerated, both regions being sealed from the atmosphere and filled with a suitable gas, such as deuterium or tritium, at low pressure, on the order of $10^{-4}$ mm. Hg. Conventional ion accelerators have ionizable gas continuously supplied to the ion source, and the region in which the ions are accelerated is continuously evacuated in order to maintain that region at a lower pressure than that prevailing in the ion source. The pumping apparatus thus necessitated is too bulky and requires too much power for use in a borehole.

In accordance with the present invention, the enclosure within which the gas is confined at static pressure is divided into two regions; an ion-source region, wherein a relatively moderate electric field and a relatively intense magnetic field perpendicular to the moderate electric field exist, and an ion-accelerating region, wherein a relatively intense electric field and a relatively weak magnetic field exist. The gas pressure, as stated, is the same in both regions. Electrons emitted from an electron source within the ion-source region are accelerated by the moderate electric field, and the lengths of the paths traveled by such electrons are made very long by the intense magnetic field, so that a cumulative ion current results in the ion-source region. Ions emerging from the ion-source region into the ion-accelerating region are accelerated by the intense electric field onto a target within the ion-accelerating region and spaced from the ion-source region. The magnetic field in the ion-accelerating region is too weak to lengthen the paths traveled by free electrons in that region by an amount sufficient to cause cumulative formation of ion pairs.

One object of my invention is the construction of a compact neutron source of the type described, having simple means for creating a magnetic field which is concentrated in the ion-source region.

Another object of my invention is the construction of a compact neutron source of the type described, having simple means for mutually isolating the electric fields in the ion-source and ion-accelerating regions.

Another object of my invention is the provision of simple and compact voltage sources to energize a compact neutron source of the type described.

Another object of my invention is the construction of a neutron source suitable for use in well-logging and satisfying the severe mechanical requirements demanded by well-logging operations.

In the drawings:

Fig. 1 is a somewhat diagrammatic view in vertical cross section of an artificial neutron source constructed in accordance with my invention;

Fig. 2 is a vertical cross section along the line 2—2 of Fig. 1;

Fig. 8 is a vertical cross section illustrating in detail the upper portion of the apparatus of Fig. 5;

Fig. 9 is a vertical cross-section along the line 9—9 of Fig. 8;

Figure 3:
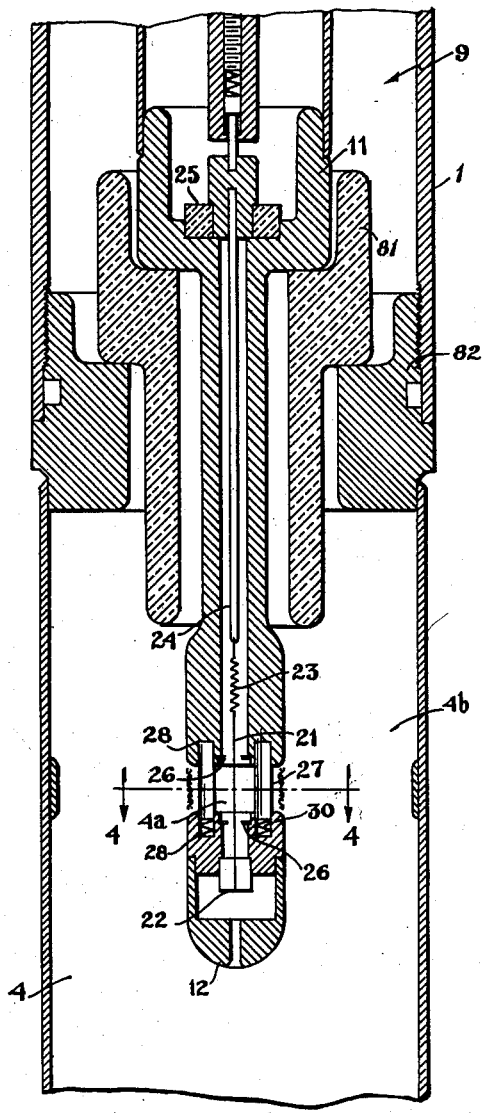
Fig. 3 is a vertical cross section illustrating in detail the lower portion of the apparatus of Figs. 1 and 2.

Referring to the drawings, and first to Figs. 1 and 2 thereof, the entire neutron source, constructed in accordance with my invention, may be enclosed within a housing 1 of generally cylindrical configuration and adapted to be lowered down a borehole. The inside diameter of the housing 1 may be as small as 3 inches, so that the apparatus of Figs. 1 and 2 may be lowered down a borehole as small as five inches in diameter. The housing 1 is of conductive material and is at ground potential. The apparatus of Figs. 1 and 2 may be lowered and raised in the borehole by conventional apparatus well known in the well-logging art, as by a suitable cable (not shown). The entire power for operating the neutron source is derived through a single electric motor 2, to which electric power is supplied from the surface by means of suitable wires 3 which may be enclosed within the cable. In neutron well-logging operations only a limited amount of power may conveniently be transmitted down the borehole, and only a fraction of this power is available for the generation of neutrons. A representative figure for the power available for the neutron source is 40 watts out of a total of 100 watts transmitted down the borehole. In the apparatus of Figs. 1 and 2, this power is delivered to the motor 2.

The motor 2, of course, must be of small dimensions so as to fit within the housing 1. An induction motor is preferable to a synchronous motor, because of its greater torque. A suitable induction motor would be one having a rated input of 35 watts, 115 volts, single phase, 60 cycles, operating at 6000–7000 r.p.m. and a rated output of $\frac{1}{200}$ horsepower.

The interior of the housing 1 is divided into two main compartments. The neutron-source proper is housed in the lower compartment 4. The upper compartment 5 houses the motor 2 and the voltage generators which are necessary to operate the neutron source. In operation, the upper compartment 5 is filled with a gas under pressure in order to insulate the various high-voltage parts of the apparatus from the grounded housing 1. The lower compartment 4 is filled with a suitable gas, such as deuterium or tritium, at very low pressure. These two compartments 4, 5 are therefore hermetically closed off from the surrounding atmosphere, as by suitable gaskets 6, and from each other, as by suitable vacuum-tight seals 7.

The lower compartment 4 constitutes the static-atmosphere enclosure hereinbefore referred to and accordingly it is divided into two regions: an ion-source region 4a and an ion-accelerating region 4b. In the apparatus of Figs. 1 and 2, the ion-source region 4a is located centrally in the housing 1, and a target 8 is supported circumferentially about the ion-source region 4a near the housing 1, so as to be spaced from the ion-source region 4a. This arrangement has certain advantages to be described; however, other arrangements are possible, such as that diagrammatically shown in Fig. 6, wherein both the ion-source region 4a' and the target 8' are located centrally in the housing 1, being mutually spaced along the axis of the housing 1.

Referring again to Fig. 1, the mutual isolation of the electric fields in the ion-source region 4a and the ion-accelerating region 4b is accomplished by enclosing the ion-source region 4a in a hollow electrode 9, which acts as a Faraday cage. In order to permit the passage of ions therethrough, a portion of the hollow electrode 9 comprises a conductive mesh or screen 10 which fits between a main hollow electrode 11 and a hollow substantially hemispherical end-piece 12. For example, a 50 x 50 mesh of .009-inch diameter stainless-steel wire may be used for this purpose. The "hollow electrode 9" thus refers to the combination of the main hollow electrode 11, the screen 10, and the end-piece 12.

Power is required to maintain the electric field in the ion-accelerating region 4b, since this electric field is doing work by accelerating ions from the ion-source region 4a to the target 8. Power is also required to maintain the electric field in the ion-source region 4a, since this electric field is doing work by separating gas molecules into ion pairs. Power is not required to maintain the magnetic field in the ion-source region 4a, since the magnetic field does no work.

In accordance with my invention, the ion-accelerating voltage is generated by an improved form of electrostatic belt-type generator, and in a preferred form of the invention the ion-source voltage is generated by a similar electrostatic generator closely associated with the main generator. Alternatively, the ion-source voltage may be derived from a battery or generated by an alternator or other conventional type of voltage source, without departing from the spirit and scope of the invention.

The principle of operation of an electrostatic belt-type generator is well known. Such a generator comprises essentially a hollow electrode on which electric charge is accumulated, an insulating belt which carries electric charge from ground to the interior of the hollow electrode, means for depositing electric charge on the belt at ground, and means for transferring electric charge from the belt to the hollow electrode. The mechanical energy used to drive the belt is thus converted into the potential energy of the accumulation of electric charge on the hollow electrode, and this potential energy is subsequently converted into the kinetic energy of a current flow. This energy conversion is very efficient. Thus, in the apparatus of Figs. 1 and 2, more than 70% of the mechanical energy supplied by the motor 2 is converted into the kinetic energy of a current flow, so that a motor supplying $\frac{1}{200}$ H.P., or 3.73 watts, enables the generator to deliver 20 $\mu a$ at 150 kv., or 3 watts.

Where, as in the apparatus of Figs. 1 and 2, the ion-source is at high potential, the voltage source for the ion-source must also be at high potential. This means that the external power necessary to operate the voltage source must be delivered from ground to a high potential. If electric power is thus delivered from ground to high potential, the problem of insulating the leads for conveying the electric power is a severe one. In accordance with a preferred form of my invention, I use the mechanical energy which has been conveyed to high potential by the belt of the main generator to drive a second electrostatic belt-type generator which constitutes the voltage source for the ion source. As hereinbefore stated, my invention is not limited to any particular type of voltage source for the ion source. However, in general, it will be advantageous to use a voltage source, such as an electrostatic belt-type generator or alternator, which converts mechanical energy into electrical energy, and to drive such a voltage source by means of the kinetic energy of the moving belt of the main generator.

Referring to Figs. 1 and 2, the hollow electrode 9, which serves to isolate the electric field in the ion-source region 4a from the electric field in the ion-accelerating region 4b, also serves as the hollow electrode of the main electrostatic belt-type generator 13. Moreover, the hollow electrode 9 is elongated so as entirely to surround the second electrostatic belt-type generator 14, so that the hollow electrode 9 electrically isolates from its surroundings the entire ion-source assembly, including the ion-source region 4a and the voltage generator 14 which produces the ion-source voltage.

Electric charge is carried to the hollow electrode 9 on an endless belt 15 of insulating material, to be described in detail hereinafter, which is supported between two pulleys 16, 17. The upper pulley 16 is rotated by means of the motor 2, which drives the pulley 16 through a gear train 18 (Fig. 2). The lower pulley 17 is mounted within the hollow electrode 9.

A wire screen 19 is supported, at ground potential, so that one edge thereof barely touches the surface of the belt 15 as the belt 15 passes around the upper pulley 16. A second wire screen 20 is supported within and electrically connected to the hollow electrode 9, so that one edge of the wire screen 20 barely touches the surface of the belt 15, as the belt 15 passes around the lower pulley 17.

The electrostatic belt-type generator 13, as illustrated, in its preferred form, is self-excited, with the charging of the belt 15 being initiated by friction between the belt 15 and at least one of the pulleys 16, 17. For excitation purposes, only the outer surface of at least one of the pulleys 16, 17 need be of insulating material, and the other pulley may comprise a conductive member. However, preferably the outer surfaces of both pulleys 16, 17 are of insulating material. The choice of insulating materials must be such that the insulating material of the upper pulley 16, the belt 15, and the lower pulley 17 follow an ascending sequence in the triboelectric series if a positive potential is to be generated at the hollow electrode 9, and a descending sequence in the triboelectric series if a negative potential is to be generated at the hollow electrode 9. Thus, if a silicone rubber belt of the type hereinafter described, is employed, and if a positive potential is to be generated at the hollow electrode 9, the upper pulley 16 may comprise a short length of polyethylene tubing. In order that it may withstand high-temperature conditions, the polyethylene tubing must be cross-linked, as by irradiating it with high-energy electrons, prior to use in the generator. The lower pulley 17 may then comprise a short length of glass tubing.

When the motor 2 drives the upper pulley 16, friction between the pulley 16 and the belt 15 creates a small amount of negative charge on the pulley 16, which causes positive charge to be deposited by corona from the grounded screen 19 onto the outer surface of the belt 15. Despite the fact that the grounded screen 19 apparently touches the belt 15, there will nevertheless always be a thin layer of gas between the screen 19 and the belt 15. Ionization of this gas by the electric field at the edge of the screen 15 constitutes the corona. Since the corona originates from the sharp points at the edge of the screen, the screens 19, 20 should be of as fine a mesh as practical so as to present a maximum number of sharp points towards the belt 15. Neglecting for the moment any charge on the lower pulley 17, the only electric field within the hollow electrode 9 in the vicinity of the screen 20 is that due to the positive charge of the belt 15, regardless of the amount of electric charge which has accumulated on the hollow electrode 9, owing to the fact that the hollow electrode 9 acts as a Faraday cage. When this positive charge arrives opposite the screen 20, the resultant high gradient between the belt 15 and the screen 20 causes ionization of the intervening gas (i.e. corona), and a flow of positive charge to (or, more correctly, a flow of negative charge from) the screen 20.

The lower pulley 17 may comprise a conductive member. However, performance is improved if the lower pulley 17 is composed of an insulating material such as glass, so that friction between the pulley 17 and the belt 15 creates a small amount of positive charge on the pulley 17. This serves to augment the transfer of positive charge to (or negative charge from) the screen 20; and, in fact, results in a net negative charge on the belt 15. As the belt 15 carries this net negative charge back to ground, the positive potential of the hollow electrode 9 tends to increase in the same manner as though the belt were carrying positive charge to the hollow electrode 9. Thus both halves of the belt 15, that approaching and that leaving the hollow electrode 9, assist in the delivery of positive charge to the hollow electrode 9.

It is not necessary that the electrostatic belt-type generator 13 be self-excited, and an external belt-charging power supply may be employed. However, where a compact design is desired, as in the field of neutron well-logging, it is advantageous to eliminate the additional power supply which is required to charge the belt in a non-self-excited generator.

The voltage between the hollow electrode 9 and the housing 1 should be maximized, since this is the voltage across the ion-accelerating region 4b. The voltage supportable across the ion-accelerating region 4b tends to increase with increased spacing between the hollow electrode 9 and the housing 1. However, increasing this spacing for a housing 1 of fixed inner diameter necessitates increasing the curvature at the surface of the hollow electrode 9, which in turn increases the voltage gradient at that surface. Since the permissible voltage is limited to a value for which the maximum gradient in the ion-accelerating region 4b is below the breakdown gradient, there is an optimum outside diameter for the hollow electrode 9. Where, as in the apparatus of Figs. 1 and 2, the hollow electrode 9 is positively charged, the optimum outside diameter for the hollow electrode 9 is approximately one-third the inner diameter of the housing 1, in order to achieve maximum voltage across the ion-accelerating region 4b. This optimum outside diameter for the hollow electrode 9 is used in the lower compartment 4, as shown in Figs. 1 and 2.

However, it is desirable to construct the upper end of the hollow electrode 9 with as large an outside diameter as possible, in order that the belt 15 may be as wide as possible. This is because, as described hereinafter, the current-carrying capacity of the belt 15 increases with belt width. The outside diameter of the hollow electrode 9 may be greater within the upper compartment 5 than within the lower compartment 4 if the insulating property of the medium separating the hollow electrode 9 from the housing 1 is greater in the upper compartment 5 than in the lower compartment 4. The lower compartment 4 is, of necessity, filled with a gas at a pressure on the order of $10^{-4}$ mm. Hg. If the upper compartment 5 is filled with a suitable gas under pressure, and if the outside diameter of the hollow electrode 9 in the lower compartment 4 has its optimum value of one-third the inside diameter of the housing 1, then the outside diameter of the hollow electrode 9 within the upper compartment 5 may be greater than one-third the inside diameter of the housing 1. In general, the insulating property of a gas increases with increased pressure. However, there is an upper limit to the pressure of the gas within the upper compartment 5, owing to the fact that the corona current obtainable at the screens 19, 20 decreases with increased gas pressure. As determined by my experiments, the gas pressure in the upper compartment 5 must be in the range between 100 and 400 p.s.i. gage for satisfactory operation, and the optimum pressure is about 300 p.s.i. gage. With the gas pressure in this range, the upper end of the hollow electrode 9 may have an outside diameter of about one-half the inside diameter of the housing 1. I have obtained good results with carbon dioxide, although other gas compositions, such as nitrogen, may be used. Preferably only gases which are predominantly non-electropositive are used as the insulating gas in the upper compartment 5.

It may be noted that the gas under pressure in the upper compartment 5 increases the efficiency of the motor 2, since it is able to conduct heat away from the motor 2 more rapidly than atmospheric air.

Figure 4:
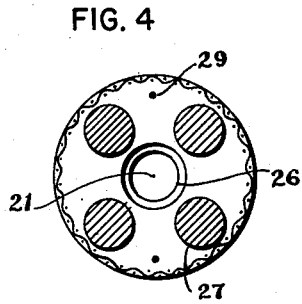
Fig. 4 is a horizontal cross section along the line 4—4 of Fig. 3.

Referring now to Figs. 3 and 4, therein are shown the various components for the production of ions, which are located within the hollow electrode 9. As hereinbefore stated, there exists within the ion-source region 4a a moderate electric field and a relatively intense magnetic field. The purpose of the moderate electric field is to impart kinetic energy to free electrons within the ion-source region 4a, and to assist in the production of free electrons by the phenomenon of high field emission. The purpose of the relatively intense magnetic field is to cause these free electrons to travel very long paths within the confines of the ion-source region 4a.

The mean free path of an electron moving through a gas is the average value of the different distances the electron moves between successive collisions with gas molecules. The mean free path of an electron in deuterium gas at a pressure on the order of $10^{-4}$ mm. Hg is on the order of $10^2$ cm., and it is clear that in the absence of a magnetic field the ionization produced in the gas within the lower compartment 4 will be negligible, since the dimensions of the lower compartment 4 are much less than the mean free path of an electron therein. The magnetic field in the ion source region 4a must therefore be sufficiently intense so that the lengths of the paths traveled by electrons therein are well above the mean free path of such electrons in the gas.

Moreover, it is not enough that the free electrons in the ion-source region 4a collide with gas molecules. Upon collision, the electrons must have sufficient energy to cause ionization of the gas molecules. The necessary energy is on the order of 30 E.V., but, since the magnetic field causes the electrons to follow curved trajectories through the electric field, the applied voltage must be well in excess of 30 volts if the desired ionization is to occur.

Referring again to Figs. 3 and 4, a filament 21 is centrally suspended within the hollow electrode 9. One end of the filament 21 is attached to an insulator 22 within the end-piece 12, and the other end of the filament 21 is attached to a light-tension spring 23, which is suspended from a conductive rod 24 supported by an insulator 25 within the main hollow electrode 11. The filament 21 is maintained at a positive potential with respect to the hollow electrode 9 by the voltage source 14 (Figs. 1 and 2) which is located within the upper portion of the hollow electrode 9 and which will be described in detail hereinafter. The necessary electric field is thus provided between the filament 21 and the hollow electrode 9.

Two very thin apertured disks 26 of conductive material are inserted in the central apertures of the end-piece 12 and the main hollow electrode 11, respectively, at their mutually opposing faces. The inner edges of the disks 26 are made sharp in order to provide a high voltage gradient at these edges. Owing to the potential difference between the filament 21 and the hollow electrode 9, an electric field exists therebetween which is concentrated at the sharp inner edges of the apertured disks 26. This field concentration is sufficient to cause the emission of electrons from the inner edges of the disks 26, which therefore serve as the necessary source of free electrons in the ion-source region 4a. Such electrons are attracted to the filament 21, but, owing to the intense magnetic field existing in the ion-source region 4a, these electrons are deflected so that they travel very long paths through the deuterium or tritium gas before reaching the filament 21, and hence are able to create a sufficient number of ion pairs by collisions with gas molecules to trigger a cumulative creation of ions, with the free electron of each ion pair so produced assisting in the ionization process. Electron path length is also maximized by having the filament 21 of very small diameter, so as to decrease the probability of its capturing the free electrons.

A suitable number of permanent magnets 27, such as four, are supported between the end-piece 12 and the main hollow electrode 11 by being loosely fitted into sockets 28 in the mutually opposing faces of the end-piece 12 and the main hollow electrode 11. Material such as Alnico, which is suitable for the creation of the necessary intense magnetic field, may not have sufficient mechanical strength to support the end-piece 12. In this event, supporting rods 29 may be employed to provide the mechanical connection between the end-piece 12 and the main hollow electrode 11, and the magnets 27 are held rigidly in place by means of springs 30. All of the magnets 27 must be oriented in the same direction: that is, either all the north poles or all the south poles must be in the sockets 28 of the end-piece 12.

The above-described magnet configuration provides a magnetic field which is relatively intense in the ion-source region 4a but relatively weak in the ion-accelerating region 4b. Owing to the concentration of the magnetic field in the ion-source region 4a, the relatively few free electrons produced by high-field emission at the inner edges of the disks 26 are sufficient to produce the desired ion current in the ion-source region 4a with negligible ion formation in the ion-accelerating region 4b. Since the ion formation in the ion-accelerating region 4b is negligible, nearly all the ions accelerated by the intense electric field in the ion-accelerating region 4b arrive at the target 8 after falling through the entire potential drop between the hollow electrode 9 and the target 8. Thus the potential energy stored in the hollow electrode 9 is converted almost entirely into the kinetic energy of ions having enough energy for the efficient production of neutrons at the target 8. If the magnetic field in the ion-accelerating region 4b were intense enough to cause cumulative formation of ions in that region, much of the potential energy stored in the hollow electrode 9 would be wasted in the acceleration of ions to energies insufficient for the efficient production of neutrons.

Optimum results are obtained with a magnetic field of about 400 gausses. In apparatus of the type shown in Figs. 1 and 2 and designed to fit into a housing 1 having a 3-inch inside diameter, a magnetic field of about 400 gausses has been obtained in the region bounded by the magnets 27, using four Alnico permanent magnets ⅛-inch in diameter and positioned symmetrically on a ⅝-inch diameter circle.

There will be some degree of concentration of magnetic field just outside the region bounded by the magnets 27. Moreover, the edges of the mesh 10 are sharp, and concentration of voltage gradient will tend to occur at these edges. The edges of the mutually opposing faces of the main hollow electrode 11 and the end-piece 12 are therefore well-rounded, so as to provide a region of low voltage gradient in the vicinity of the mesh 10 and just outside the region bounded by the magnets 27, thereby minimizing the undesirable effects of the sharp edges of the mesh 10 and the magnetic field just outside the region bounded by the magnets 27.

The gas pressure within the lower compartment 4 must be less than $10^{-3}$ mm. Hg, and the optimum pressure is on the order of $10^{-4}$ mm. Hg. At pressures above $10^{-3}$ mm. Hg, the mean free path of an electron is on the order of magnitude of the dimensions of the neutron source, thus tending to cause electrical breakdown in the ion-accelerating region 4b.

The positive potential applied to the filament 21 with respect to the hollow electrode 9 must be more than 400 volts, and the optimum voltage is about 3 kv. At potentials below 400 volts the magnetic field required would be prohibitively large, since the lengths of the paths traveled by free electrons in the ion-source region 4a would have to be far in excess of the mean free path in order to provide a reasonable probability that collisions between electrons and gas molecules would result in ionization.

With a magnetic field of 400 gausses and a gas pressure of $3 \times 10^{-4}$ mm. Hg, an ion-source current of 25 microamperes may be obtained with a positive potential of 3 kv., applied to the filament 21.

Figure 6:
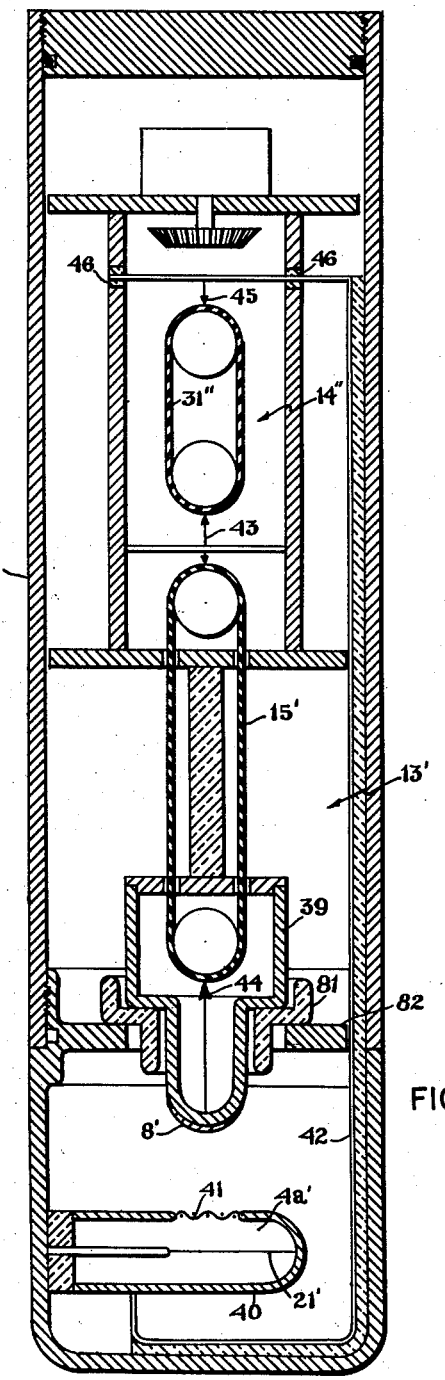
Fig. 6 is a somewhat diagrammatic view in vertical cross section illustrating a modified arrangement of the ion source and target of an artificial neutron source constructed in accordance with my invention.

In addition to the voltage source 14 needed to supply the positive potential to the filament 21, a high-voltage source 13 is required for the acceleration of ions in the ion-accelerating region 4b (see Figs. 1 and 2). In the apparatus of Figs. 1 and 2, a high positive potential is applied to the hollow electrode 9 with respect to the grounded target 8. In the apparatus of Fig. 6, a high negative potential is applied to the target 8' with respect to the ion-source region 4a'. For the d, T reaction, this accelerating voltage must be at least 75 kv. for neutron production and at least 100 kv. for maximum efficiency of neutron production with a thin target. The minimum voltage for maximum efficiency of neutron production increases with target thickness. Since even a thick target is very thin in comparison with the width of the ion-accelerating region 4b, the target should be as thick as possible for efficient neutron production with the accelerating voltage available. The accelerating voltage is limited only by the lateral dimensions of the borehole.

In the apparatus of Figs. 1 and 2, if the inside diameter of the housing 1 is 3 inches, the optimum outside diameter of the hollow electrode 9 (in the lower compartment 4) for maximum voltage is about 1 inch, and the accelerating voltage will be in the range between 150 kv. and 200 kv.

As hereinbefore stated, the only power sources required to operate the neutron source are the ion-accelerating voltage source and the ion-formation voltage source. In accordance with my invention, the ion-accelerating voltage is derived from an electrostatic belt-type generator 13 to which mechanical power is supplied by a motor 2, and in a preferred form of the invention the ion-formation voltage is derived from a second electrostatic belt-type generator 14 which utilizes some of the mechanical power which is delivered by the belt 15 of the main electrostatic belt-type generator 13 to the interior of the hollow electrode 9 (see Figs. 1 and 2).

Figure 5:
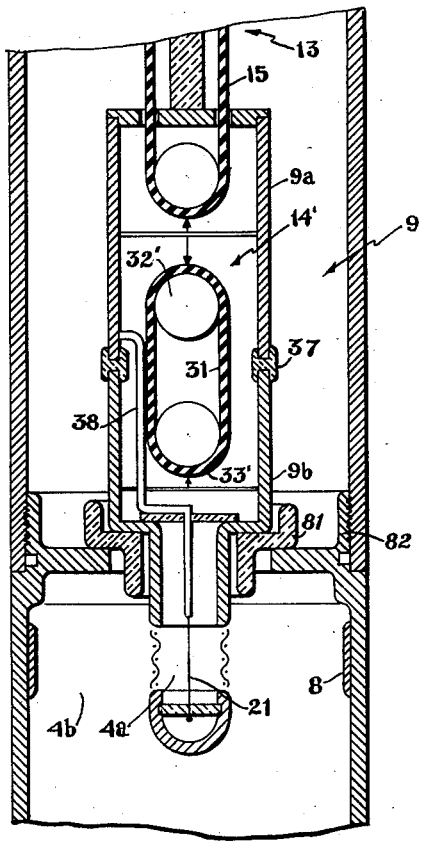
Fig. 5 is a somewhat diagrammatic view in vertical cross section illustrating a modification of the apparatus of Figs. 1 and 2.

The two electrostatic generators 13, 14 may be utilized in either of two alternative ways. Suppose the main high-voltage generator 13 provides a potential of +200 kv. This potential may be applied to the outer electrode of the ion source, as shown in Figs. 1 and 2, wherein said outer electrode of the ion source forms an integral part of the hollow electrode 9. The second generator 14 is then caused to produce a potential of, say, +3 kv. with respect to the hollow electrode 9, and this potential is applied to the filament 21. Alternatively, the +200 kv. furnished by the main generator 13 may be applied to the central filament 21, as shown in Fig. 5; the second generator 14 is then caused to produce a potential of −3 kv. with respect to the central filament 21, and this potential is applied to the outer electrode of the ion source. (In Fig. 5, as in Figs. 1 and 2, said outer electrode of the ion source forms an integral part of the hollow electrode 9.) The former alternative has the advantage of the simpler structure; the latter alternative has the advantage that it imposes less current requirements on the belt of the second generator 14.

In the apparatus of Figs. 1 and 2, the second generator 14 provides a voltage which is positive with respect to that of the hollow electrode 9. The entire second generator 14 is enclosed within the hollow electrode 9, thereby electrically isolating the second generator from the accelerating electric field produced by the main generator 13. Since the second generator 14 produces a relatively low voltage, problems of insulation are relatively simple. Moreover, the second generator 14 does not require a hollow terminal for the accumulation of electric charge.

The belt 31 of the second generator 14, which is similar to the belt 15 of the main generator 13, except for its shorter length, is supported between two pulleys 32, 33 which are rotatably mounted within the hollow electrode 9. The upper pulley 32 of the second generator 14 is driven by the lower pulley 17 of the main generator 13, to which it is connected by a gear train 34 (Fig. 2). Electric charge is sprayed onto the belt 31 as it travels over the upper pulley 32 by the wire screen 20, which is electrically connected to the hollow electrode 9, and which is supported so that one edge thereof barely touches the belt 31 as it travels over the upper pulley 32. Opposite edges of a single wire screen 20 thus respectively serve as the charge-collector for the main generator 13 and as the charge-spray-on for the second generator 14. The charge on the belt 31 is collected by another wire screen 35, supported so that one edge thereof barely touches the belt 31 as it travels over the lower pulley 33. This collector screen 35 is electrically connected directly to the filament 21, since no hollow terminal is necessary for the accumulation of electric charge.

In the apparatus of Figs. 1 and 2, the insulator portions of the pulleys 32, 33 are composed of material suitable for the delivery of positive charge from the hollow electrode 9 to the filament 21. Thus, irradiated polyethylene may be used as the insulator of the upper pulley 32, and glass may be used as the insulator of the lower pulley 33.

The belt 15 of the main generator 13 must deliver to the main collector screen 20 a current equal to the current from the positive electrode 9 to ground. The current arriving at ground comprises principally the current in the main ion beam delivered to the target 8, which is, for example, about 15–20 microamperes, and leakage currents which total about 2–3 microamperes. In addition, there may be some current arriving at ground due to secondary electrons emitted at the target 8 and to the formation, by these secondary electrons or by the main ion beam, of ion pairs in the ion-accelerating region 4b of the neutron source. This current may be minimized by providing a suppressor grid 36 in the vicinity of the target 8. Since only a relatively small negative bias need be applied to the suppressor grid 36 with respect to the grounded target 8, a conventional voltage source may be employed for this purpose. Thus the current arriving at ground is about 20 microamperes, which must be supplied by the belt 15 of the main generator 13.

The belt 31 of the second generator 14 must deliver to the second collector screen 35 a current equal to the current leaving the filament 21. The current leaving the filament 21 comprises principally the current due to the formation of ion pairs in the ion source region 4a of the neutron source. This current is about 30–40 microamperes, of which approximately half goes into the main ion beam. There is also a negligible additional current due to the electrons emitted at the disks 26 by high field emission. Thus the current leaving the filament 21 is about twice the current arriving at ground, and must be supplied by the belt 31 of the second generator 14.

Since the belt 31 of the second generator 14 must deliver about twice the current delivered by the belt 15 of the main generator 13, and since both belts 15, 31 are of the same width, the second belt 31 must have about twice the linear velocity of the main belt 15. This is accomplished by suitable choice of gears in the gear train 34 connecting the lower pulley 17 of the main generator 13 to the upper pulley 32 of the second generator 14.

In the apparatus of Fig. 5, the hollow electrode 9 is divided into two parts, as shown at 9a and 9b, separated by an insulator 37. The belt 15 of the main generator 13 delivers electric charge to the upper half 9a of the hollow electrode 9, thereby maintaining the upper half 9a at a high potential of, say, +200 kv., and this potential is applied to the filament 21 by means of the lead 38. The second generator 14' is similar to the second generator 14 of Figs. 1 and 2, except that in Fig. 5 the insulator portions of the pulleys 32', 33' are composed of material suitable for the delivery of negative charge from the upper half 9a of the hollow electrode 9 to the lower half 9b thereof, which forms the outer electrode of the ion source. Thus, glass may be used as the insulator of the upper pulley 32', and irradiated polyethylene may be used as the insulator of the lower pulley 33'.

In the apparatus of Fig. 5, the current from the positive electrode 9b to ground comprises principally the current in the main ion beam delivered to the target 8 and leakage currents. As in the case of the apparatus of Figs. 1 and 2, this current is about 20 microamperes, and is supplied by the belt 15 of the main generator 13. The current from the filament 21 to the positive electrode 9b comprises principally the current due to the formation of ion pairs in the ion source region 4a of the neutron source. This current is about 40 microamperes, of which (unlike the case of the apparatus of Figs. 1 and 2) about 20 microamperes is supplied by the belt 15 of the main generator 13, so that the belt 31 of the second generator 14' need supply only 20 microamperes, instead of the 40 microamperes required in the case of the apparatus of Figs. 1 and 2. Since the current delivered by the second belt 31 is about the same as that delivered by the first belt 15, the gear train 34 (shown in Fig. 2) is modified so that both belts 15, 31 have the same linear velocity.

The use of an electrostatic belt-type generator, not only as the voltage source for the acceleration of ions, but also as the voltage source for the production of ions, has important advantages which result from the fact that an electrostatic belt-type generator is essentially a constant-current device, which is readily converted into a constant-voltage device.

The current leaving the high-voltage terminal of an electrostatic belt-type generator (i.e. the total load current) always tends to equal that delivered thereto by the belt (i.e. the charging current). If the total load current tends to increase, the voltage of the terminal tends to fall, thereby opposing the tendency of the total load current to increase. Conversely, if the total load current tends to decrease, the voltage of the terminal tends to rise, thereby opposing the tendency of the total load current to decrease. Consequently, if the charging current is constant, the voltage of the terminal will tend to fluctuate so as to maintain the total load current constant. If it is desired to stabilize the voltage of the terminal, a leakage current (such as a corona discharge path) is included in the total load current, which leakage current is adapted to vary by a relatively large amount in response to relatively small variations in terminal voltage.

The neutron yield produced by apparatus such as that shown in Figs. 1 and 2 depends upon the ion-accelerating voltage (i.e., the energy of the ions upon arrival at the target) and upon the ion current in the main ion-beam. Hence, the main generator 13 should be operated as a constant-voltage device, and the second generator 14 should be operated as a constant-current device.

Thus, in the apparatus of Fig. 1, assume that the belt 15 of the main generator 13 delivers a constant current to the hollow electrode 9, and that the belt 31 of the second generator 14 delivers a constant current to the filament 21. The hollow electrode 9 is maintained at constant potential by providing a leakage current away from the hollow electrode 9, which leakage current is caused to vary, in a manner to be described in detail hereinafter, in such a way as to stabilize the potential of the hollow electrode 9. The potential of the hollow electrode 9 is stabilized in order that the neutron yield, which varies with the ion-accelerating voltage, may be maintained constant.

In order to maintain a constant neutron yield, not only must the ion-accelerating voltage be stabilized, but also the ion current in the main ion beam must be stabilized. This ion current depends, not only upon the voltage between the filament 21 and the hollow electrode 9, but also upon various other factors, such as the gas pressure in the ion-source region 4a. Thus, even if the voltage between the filament 21 and the hollow electrode 9 were stabilized, variations in gas pressure in the ion-source region 4a, as well as other factors, would alter the ion current between the filament 21 and the hollow electrode 9, and hence the ion current in the main ion beam would fluctuate. However, the ion current in the main ion beam is practically always the same fraction of the ion current between the filament 21 and the hollow electrode 9, and the ion current between the filament 21 and the hollow electrode 9 is practically always equal to the current delivered to the filament 21 by the belt 31 of the second generator 14 (Figs. 1 and 2).

Hence, in the apparatus of Fig. 1, the belt 31 of the second generator 14 should deliver a constant current to the filament 21; and so, unlike the main generator 13, no variable leakage current is provided in the second generator 14. Consequently, if a variation in gas pressure or some other factor tends to reduce the ion current in the ion-source region 4a, charge will accumulate on the filament 21 owing to the fact that the belt 31 is delivering more current thereto than is being removed therefrom. Hence, the voltage of the filament 21 will rise, and as a consequence the ion current in the ion-source region 4a will increase until said ion current again equals the current delivered by the belt 31. In this way, the ion-current in the ion-source region 4a is automatically stabilized.

The fact that the use of an electrostatic belt-type generator as the voltage source for the production of ions tends to stabilize the ion current warrants the use of such a generator even where the ion source is at ground potential, as in the apparatus of Fig. 6.

Referring to said Fig. 6, the main generator 13' shown therein is similar to the main generator 13 shown in Figs. 1, 2, and 5, except that the main generator 13' of Fig. 6 is adapted to produce a high negative potential, and except that the hollow electrode 39 of Fig. 6, upon which said negative potential is produced, does not enclose the ion source assembly. Instead of enclosing the ion source assembly, the hollow electrode 39 serves to support the target 8', which is thus maintained at a high negative potential.

The ion source of Fig. 6 is similar to that shown in Figs. 1–5, and includes a filament 21' surrounded by an outer electrode 40. The wire mesh 41 of Fig. 6 is similar to the wire mesh 10 of Figs. 1–5, except that it need extend only over that portion of the outer electrode 40 which faces the target 8'. The filament 21' is at ground potential, being connected directly to the housing 1, and a negative potential is applied to the outer electrode 40 by the second generator 14" via a lead 42, which for most of its length may be supported upon but insulated from the housing 1.

A grounded wire screen 43 sprays negative charge onto both the belt 15' of the main generator 13' and the belt 31" of the second generator 14". This negative charge is collected from the main belt 15' by the wire screen 44 inside the hollow electrode 39, and from the second belt 31" by a wire screen 45 which is insulated from ground by insulators 46, and which is connected to the lead 42.

Figure 7:
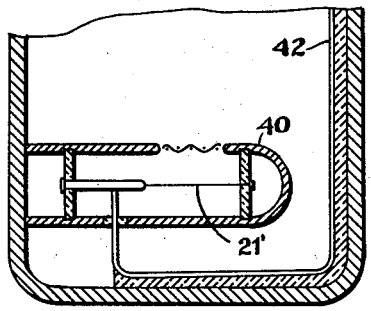
Fig. 7 is a diagram illustrating a modification of the apparatus of Fig. 6.

In the apparatus of Fig. 6, the second generator 14" produces a negative voltage, which is applied to the outer electrode 40 of the ion source. Alternatively, by reversing the insulating materials used in the pulleys of the second generator 14", it may be caused to produce a positive voltage, which should be applied to the filament 21' as shown in Fig. 7, the outer electrode 40 being grounded. The arrangement shown in Fig. 6 is preferable to that shown in Fig. 7, since the current required of the second generator 14" in the latter case is about twice that required in the former case; and, unlike the apparatus of Figs. 1 and 2 as compared with that of Fig. 5, the apparatus of Fig. 7 is no simpler than that of Fig. 6.

Figure 10:
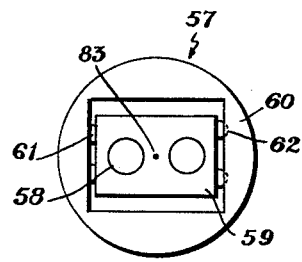
Fig. 10 is a horizontal cross-section along the line 10—10 of Fig. 9.

A preferred construction of the electrostatic generators of my invention is shown in Figs. 8, 9 and 10. Referring to said Figs. 8, 9 and 10, the shaft 47 of the upper pulley 16 is journaled in bearing-blocks 48, which in turn are affixed to a baseplate 49 of conductive material. Said baseplate 49 fits snugly in the housing 1, so as to be in electrical contact therewith and so as to keep the entire apparatus rigidly in place. An aperture 50 is provided in the baseplate 49 for passage of the belt 15.

The ground plane 51 of the main generator 13, which also fits snugly in the housing 1, is fastened to the baseplate 49 by two sets of screws 52, 53. Each screw 52 of the first set passes up through an aperture 54 in the ground plane 51 and engages a tapped aperture 55 in the baseplate 49. Each screw 53 of the second set passes down through and engages a tapped aperture 56 in the baseplate 49, and abuts against the upper surface of the ground plane 51. These two sets of screws 52, 53 permit adjustment of belt tension, as will appear hereinafter.

The column of the main generator 13 serves to support the high-voltage portions of the apparatus, and also to insulate such high-voltage portions from ground. The column is constructed of a series of conductive members 57 spaced from one another by insulating members 58. Each conductive member 57 comprises two parts: a central rectangular block 59 and a circular block 60 having a central rectangular aperture into which the rectangular block 59 is fitted. Spring-loaded balls 61 in the ends of the rectangular block 59 fit into corresponding sockets 62 in the circular block 60, so as to hold the conductive member 57 together as a unit. The central rectangular aperture in the circular block 60 is wider than the rectangular block 59, so that space is provided for passage of the two runs of the belt 15. Insulating rods or belt spacers 63 prevent the belt 15 from coming into direct electrical contact with the conductive members 57.

The conductive members 57 are spaced from one another by insulating members 58 which are cemented to the rectangular blocks 59. In Figs. 8, 9 and 10 there are shown two short cylinders 58 of insulating material between each pair of adjacent conductive members 57. The entire series of the insulating members 58 and the rectangular blocks 59 thus form a rigid unit, while the circular blocks 60, though held in place by the spring-loaded balls 61, are easily removable.

The ground plane 51 is similar to the conductive members 57, except that the part 64 of the ground plane 51 corresponding to the circular blocks 60 extends out to the housing 1, and except that the part 65 of the ground plane 51 corresponding to the rectangular blocks 59 is provided with dog-ears 66 which are affixed to the outer part 64 of the ground plane by screws 67.

The terminal plane 68 is likewise similar to the conductive members 57, except that the circular block 69 is affixed to the rectangular block 70 by means of two pins 71; and, when the terminal plane 68 is in place in the hollow electrode 9, the latter holds the pins 71 in place.

The shaft 72 of the lower pulley 17 is journaled in bearing-blocks 73 which are affixed to the terminal plane 68, as by screws 74 which engage tapped apertures 75 in the bearing-blocks 73.

The tension of the belt 15 is adjusted by the position of the set of set screws 52, the other set of screws 53 being tightened after the set screws 52 have been adjusted. When the belt 15 is to be removed, belt tension is released by loosening the screws 53, without altering the position of the set screws 52.

The shaft 76 of the upper pulley 32 of the second generator 14 is journaled in the bearing-blocks 73; while the shaft 77 of the lower pulley 33 of the second generator 14 is journaled in separate bearing-blocks 78. The two pairs of bearing-blocks 73, 78 are insulated from one another by an insulating block 79 to which they are affixed by screws 80.

The hollow electrode 9 slips snugly over the terminal plane 68, and (see Fig. 3) is supported on and cemented to an insulating support 81 and which in turn is supported on and cemented to an intruding shoulder 82 of the housing 1.

A corona point 83 is provided on the lower surface of each rectangular block 59, so that it faces the upper surface of the next lower rectangular block 59. The resultant series of corona gaps along the length of the column provides a leakage current flowing up the column from the hollow electrode 9 to ground, which serves to maintain each conductive member 57 at a controlled potential. As a result, the total voltage drop along the column is subdivided into several lesser voltage drops between adjacent conductive members 57, thereby minimizing the maximum voltage gradient along the column.

Instead of corona gaps, resistors may be used between successive conductive members 57 to provide the desired leakage current. However, the use of corona gaps is preferred, since, as the voltage across a corona gap increases, the current across the gap is negligible up to a certain voltage, and then rises increasingly rapidly with further voltage increase. Thus the use of corona gaps to provide the leakage current tends to stabilize the voltage of the electrostatic generator 13 to a greater extent than does the use of resistors. The voltage at which the electrostatic generator 13 is stabilized is determined by the spacing across the corona gaps. The corona points may be easily provided by press-fitting needles 83 into sockets 84 which are drilled in the lower surface of each rectangular block 59, but not all the way through the block 59, since a smooth plane surface must be presented to the next higher corona point 83. The spacing across the corona gaps is adjusted by manual movement of the needles 83 in their respective sockets 84.

Voltage stabilization may be further enhanced through the provision of one or more additional corona points 85 at the inner wall of the housing 1 facing the hollow electrode 9.

The current delivered by the belt 15 to the hollow electrode 9 depends on numerous factors, including the corona current delivered at the screens 19, 20, the speed of the belt 15, the width of the belt 15, and the ability of the belt 15 to hold the electric charge sprayed onto its outer surface.

The electrostatic generators illustrated in the drawings are self-excited, so that the potential difference between each insulating pulley and its associated wire screen, which is created by friction between the belt and the pulley, will generally be sufficient to cause a corona current from the screen which is greater than the current which the belt is capable of carrying away. Thus the charge density on the belt is approximately the same, regardless of belt speed. This means that the current delivered by the belt is approximately directly proportional to the linear speed of the belt.

The current delivered by the belt is also approximately directly proportional to the width of the belt. Generally, the belt 15 of the main generator 13 should be as wide as the compact nature of the apparatus will allow. Thus, as hereinbefore described with reference to Figs. 1 and 2, in order to obtain maximum voltage, the outside diameter of the hollow electrode 9 is limited to about one-half the inside diameter of the housing 1. If the inside diameter of the housing 1 is three inches, the outside diameter of the hollow electrode 9 will then be one and one-half inches for maximum voltage, and the belt 15 will be about three-quarters of an inch wide.

Although the apparatus of Figs. 1 and 2 is designed for maximum voltage, in some cases it may be desirable to operate at a lower voltage in order to obtain a higher current. Thus, by increasing the outside diameter of the hollow electrode 9, greater current may be obtained through use of a wider belt 15, but only at the expense of voltage. However, in some cases greater neutron yields may result from the use of higher current at lower voltage. The neutron yiled is related to the voltage and current outputs as follows:

$$\text{Neutron yield} = kV^x i_b$$

where $k$ is a constant of proportionality, $V$ is the voltage, $i_b$ is the current, and $x$ is a number which may vary depending upon various factors. If conditions are such that $x$ is greater than 1, the neutron source should operate at maximum voltage despite the loss in current. If conditions are such that $x$ is less than 1, the neutron source should operate less than the maximum voltage in order to obtain larger current.

The composition of the belt is an important factor, since the ability of the belt to hold the electric charge sprayed onto its outer surface is determined thereby. An important feature of my invention is a novel belt and a novel method of making the same. Essentially, a belt made in accordance with my invention comprises an endless length of glass fiber tape impregnated with silicone rubber, and it is manufactured in the following manner.

Figure 11:
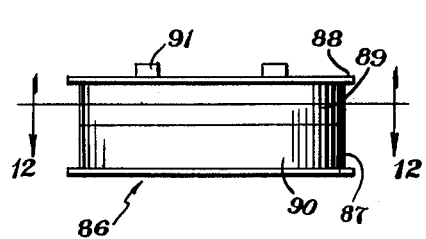
Fig. 11 is a side elevation of a drum which is used in the manufacture of a belt for an electrostatic belt-type generator in accordance with my invention.
Figure 12:
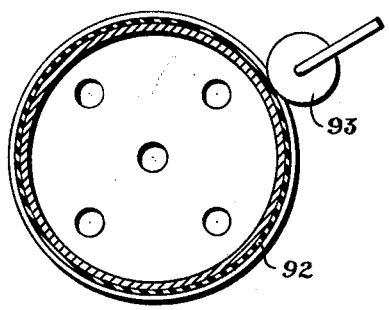
Fig. 12 is a cross-section along the line 12—12 of Fig. 11.

Referring to Figs. 11 and 12, therein is shown at 86 a drum whose circumferential surface 87 is smooth and bounded by flanges 88. The drum 86 comprises two pieces 89, 90, which are fastened together by bolts 91. The surface 87 is coated with a silicone rubber solution, as by applying it thereto with a brush. Preferably more than one coat is applied, each successive coat being applied after the solvent has evaporated from the previous coat.

One or more coats of silicone rubber solution are similarly applied to each surface of a strip 92 of glass fiber tape. For a single-ply belt, the length of the strip 92 should be appreciably greater than the circumference of the drum 86; for a double-ply belt the length of the strip 92 should be slightly less than twice that of the circumference of the drum 86. The strip 92 is then wrapped around the drum 86, whose circumference is equal to the length of the belt desired. The strip 92 is then compressed as by means of a suitable roller 93. One or more additional coats of silicone rubber solution are then applied to the outer surface of the strip 92 in the same manner as before, and after the solvent has evaporated, the strip 92 is again compressed with the roller 93. The strip 92 of glass fiber tape is thus impregnated with silicone rubber, which causes cohesion of the superimposed layers of tape.

Figure 13:
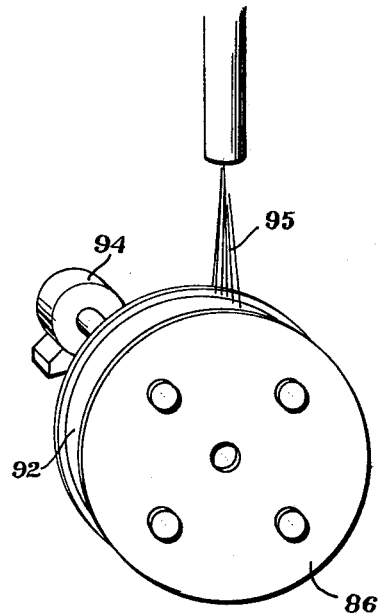
Fig. 13 is a diagram illustrating the irradiation, with high-energy electrons, of a belt for an electrostatic belt-type generator in accordance with my invention.

The drum 86 is then rotated about its axis, as by a suitable motor 94, and a beam of high energy electrons 95 is directed onto the strip 92, as shown in Fig. 13. The electron irradiation causes cross-linking in the silicone rubber—i.e., vulcanization thereof—so that a rubber-like endless belt results. The requisite irradiation dosage is about 5 to 50 mega REP. A lower dosage will not vulcanize the silicone rubber, and a higher dosage will render the belt brittle. The dose depends only on the electron current density delivered to the strip 92 and on the total irradiation time. The energy of the electrons must be sufficient to penetrate through the strip 92. For uniform dosage, the drum 86 must be rotated either an integral number of times or else a large number of times. The former procedure is too susceptible to error to be practical, and so the drum 86 is rotated many times. The speed of rotation is irrelevant except that, for a given total irradiation time, the speed of rotation must be sufficient to provide many rotations during that total irradiation time. If a three-quarter-inch belt is irradiated with a 2-m.e.v., 67-microampere electron beam scanned over a length of 5 inches, the proper total irradiation time is 11 minutes 6 seconds, and a suitable rotational speed is .9 r.p.m. After irradiation, the two halves 89, 90 of the drum 86 are separated by removing the bolts 91, and the finished belt is removed from the drum 86.

Having thus described the method of producing neutrons in accordance with my invention together with various embodiments of apparatus for carrying out the method, it is to be understood that although specific terms are employed, they are used in a generic and descriptive sense and not for purposes of limitation, the scope of the invention being set forth in the following claims.

I claim:

1. A neutron source which is adapted to operate in a borehole and to which only a limited amount of electric power can be supplied from the surface, comprising in combination: a motor adapted to convert the available electric power into mechanical power; an electrostatic belt-type generator including an endless belt of insulating material and a hollow electrode to which electric charge is carried by said belt; means to apply the mechanical power provided by said motor to the movement of said belt, whereby said mechanical power is converted into the potential energy of the electric charge accumulated on said hollow electrode; a source of positive ions; a target spaced from said source and suitable for the production of neutrons upon bombardment by said positive ions; and means to expose at least some of said positive ions to the accelerating electric field produced by the electric charge accumulated on said hollow electrode in such a manner that the positive ions so exposed are accelerated by said field onto said target.

2. A neutron source which is adapted to operate in a borehole and to which only a limited amount of electric power can be supplied from the surface, comprising in combination: a motor adapted to convert the available electric power into mechanical power; a first electrostatic belt-type generator including a first endless belt of insulating material and a hollow electrode to which electric charge is carried by said first belt; means to apply the mechanical power provided by said motor to the movement of said first belt, whereby said mechanical power is converted into the potential energy of the electric charge accumulated on said hollow electrode; a source of positive ions wherein the energy for the necessary ionization is derived from a potential difference between said hollow electrode and a second electrode; a second electrostatic belt-type generator including a second belt of insulating material, said second belt being adapted to carry electric charge between said hollow electrode and said second electrode, thereby generating said potential difference between said electrodes; means to apply the mechanical power available within said hollow electrode, by virtue of the movement of said first belt within said hollow electrode, to the movement of said second belt; a target spaced from said source and suitable for the production of neutrons upon bombardment by said positive ions; and means to expose at least some of said positive ions to the accelerating electric field produced by the electric charge accumulated on said hollow electrode in such a manner that the positive ions so exposed are accelerated by said field onto said target.

3. A dual voltage source for an ion accelerator, said ion accelerator including a grounded target and an ion source maintained at high potential with respect to said target, the energy for the production of ions within said ion source being derived from a potential difference between electrodes in said ion source, said dual voltage source comprising in combination: a source of mechanical power; a first electrostatic belt-type generator including a first endless belt of insulating material and a hollow electrode to which electric charge is carried by said first belt; a pulley within said hollow electrode over which said first belt travels in its movement, so as to rotate said pulley; means to apply said mechanical power to the movement of said first belt; a second electrostatic belt-type generator including a second belt of insulating material and a second electrode, and said second belt being supported within said hollow electrode and being adapted to carry electric charge between said hollow electrode and said second electrode, thereby generating a potential difference between said electrodes; and means to apply the mechanical power of the rotation of said pulley to the movement of said second belt.

4. A dual voltage source in accordance with claim 3, wherein said second electrostatic belt-type generator maintains said second electrode at a potential such that the potential difference between said second electrode and ground is greater than that between said hollow electrode and ground.

5. A dual voltage source for an ion accelerator, said ion accelerator including a grounded target and an ion source maintained at high potential with respect to said target, the energy for the production of ions within said ion source being derived from a potential difference between electrodes in said ion sources, said dual voltage source comprising in combination: a source of mechanical power; a first electrostatic belt-type generator including a first endless belt of insulating material and a first hollow electrode to which electric charge is carried by said first belt; a pulley within said first hollow electrode over which said first belt travels in its movement, so as to rotate said pulley; means to apply said mechanical power to the movement of said first belt; a second electrostatic belt-type generator including a second belt of insulating material and a second hollow electrode, said first and second hollow electrodes being mutually insulated but adjacent, so that together they form a hollow enclosure; said second belt being supported within said hollow enclosure and being adapted to carry electric charge between said first hollow electrode and said second hollow electrode, thereby generating a potential difference between said electrodes; and means to apply the mechanical power of the rotation of said pulley to the movement of said second belt.

6. A dual voltage source in accordance with claim 5, wherein said second electrostatic belt-type generator maintains said second hollow electrode at a potential such that the potential difference between said second hollow electrode and ground is less than that between said first hollow electrode and ground.

7. A compact neutron source comprising in combination a hollow electrode having a least one ion-permeable section; a target spaced from said hollow electrode; a hermetically sealed enclosure enclosing said hollow electrode and said target and containing at least one heavy isotope of hydrogen at a pressure sufficiently low that the mean free path of charged particles in said enclosure is such that ionizing collisions are fewer than is necessary to maintain a discharge; a small electrode within said hollow electrode and occupying a very small fraction of the volume enclosed by said hollow electrode; a source of free electrons within said hollow electrode; means for applying a positive potential to said small electrode with respect to said hollow electrode, whereby an electric field is created within said hollow electrode; a plurality of permanent bar magnets supported within said hollow electrode spaced laterally from each other so as to encircle said small electrode with their axes substantially perpendicular to said electric field, said magnets having the same orientation; said electric field having sufficient intensity to accelerate said electrons to sufficient kinetic energy between collisions with gas molecules so that enough of said collisions will result in ionization of the gas molecules to maintain a discharge; and means for applying a positive potential of not less than 75 kilovolts to said hollow electrode with respect to said target.

8. Apparatus in accordance with claim 7, wherein said ion-permeable section is recessed with respect to the neighboring portions of said hollow electrode, whereby a region of reduced electric field is created externally adjacent to said ion-permeable section.

9. Apparatus in accordance with claim 7, wherein said ion-permeable section comprises a wire mesh.

10. A compact neutron source comprising in combination a hollow electrode having at least one ion-permeable section; a target spaced from said hollow electrode; a hermetically sealed enclosure enclosing said hollow electrode and said target and containing at least one heavy isotope of hydrogen at a pressure sufficiently low that the mean free path of charged particles in said enclosure is such that ionizing collisions are fewer than is necessary to maintain a discharge; a wire-like electrode of small diameter within said hollow electrode; means for applying a positive potential to said wire-like electrode with respect to said hollow electrode; whereby an electric field is created within said hollow electrode; at least one apertured disk of conductive material having a sharp internal edge and being supported within and electrically connected to said hollow electrode, so that said sharp internal edge surrounds said wire-like electrode in spaced relation thereto, thereby providing a region of high electric field suitable for cold emission of electrons in sufficient quantity to initiate a cumulative ion current within said hollow electrode; means for creating a magnetic field within said hollow electrode in a direction perpendicular to that of said electric field while creating a relatively negligible magnetic field outside said hollow electrode; said magnetic field within said hollow electrode having sufficient intensity to cause electrons accelerated by said electric field to travel paths the scalar sums of whose lengths are much greater than the mean free path of said electrons; said electric field having sufficient intensity to accelerate said electrons to sufficient kinetic energy between collisions with gas molecules so that enough of said collisions will result in ionization of the gas molecules to maintain a discharge; and means for applying a positive potential of not less than 75 kilovolts to said hollow electrode with respect to said target.

11. A compact neutron source comprising in combination a hermetically sealed enclosure containing a substantial proportion of at least one heavy isotope of hydrogen at a pressure of less than $10^{-3}$ mm. Hg; a hollow electrode within said enclosure and having at least one ion-permeable section; a target within said enclosure and spaced from said hollow electrode by a distance short relative to the mean free path of charged particles in said enclosure; a small electrode within said hollow electrode and occupying a very small fraction of the volume enclosed by said hollow electrode; a source of free electrons within said hollow electrode; means for applying a positive potential of at least 400 volts to said small electrode with respect to said hollow electrode, whereby an electric field is created within said hollow electrode; a plurality of permanent bar magnets, supported within said hollow electrode and spaced laterally from each other so as to encircle said small electrode, for creating a magnetic field of at least 200 gausses within said hollow electrode in a direction perpendicular to that of said electric field while creating a relatively negligible magnetic field outside said hollow electrode; and means for applying a positive potential of not less than 75 kilovolts to said hollow electrode with respect to said target.

12. Apparatus in accordance with claim 11, wherein said enclosure contains a substantial proportion of at least one heavy isotope of hydrogen at a pressure of on the order of $10^{-4}$ mm. Hg, wherein a positive potential of on the order of 3 kilovolts is applied to said small electrode with respect to said hollow electrode; and wherein a magnetic field of on the order of 400 gausses is created within said hollow electrode.

13. An electrostatic belt-type generator, comprising in combination a hollow electrode, an endless charge-carrying belt supported on at least two pulleys so as to form an elongated loop one end of which extends inside said hollow electrode, a column supported within said elongated loop and comprising alternate series of conductive members and insulating members, said conductive members extending close to said belt across the width thereof, said conductive members having insulating material on their surfaces adjacent said belt to prevent electrical contact between said conductive members and said belt, each of said conductive members being surrounded by and having supported thereon in electrical contact therewith an apertured conductive member whose outer circumference is substantially circular and whose inner circumference extends close to said belt across the width thereof, said inner circumference being provided with insulating material on its surface adjacent said belt to prevent electrical contact between said apertured conductive member and said belt, means for producing electric charge on said belt at the end of said loop which is the more remote from said hollow electrode, and means for transferring electric charge between said belt and said hollow electrode.

14. Apparatus in accordance with claim 13, wherein at least one sharp conducting point extends from one toward the other of succeeding conductive members to provide voltage gradient control by corona discharges.

15. Apparatus in accordance with claim 13, wherein a conductive enclosure of approximately twice the diameter of said hollow electrode containing insulating gas at a pressure of from 100 to 400 p.s.i. gage supports and contains said column.

16. A neutron source comprising in combination: a first electrostatic belt-type generator including a hollow electrode on which electric charge is accumulated by operation of said first generator; a second electrode; an ionizable gaseous medium disposed between said hollow electrode and said second electrode; means for ionizing said ionizable medium wherein the energy for the necessary ionization is derived from a potential difference between said hollow electrode and said second electrode; a second electrostatic belt-type generator operating at substantially constant speed adapted to generate said potential difference between said electrodes; a target spaced from said hollow electrode and means to expose at least some of said ions to the accelerating electric field produced by the electric charge accumulated on said hollow electrode in such a manner that the ions so exposed are accelerated by said field onto said target; means for causing electric charge to leak off said hollow electrode in such a way that the leakage current so produced varies greatly with relatively slight variations in the potential of said hollow electrode, whereby the potential of said hollow electrode is stabilized; and means for insulating said second electrode from said hollow electrode in such a way that the only appreciable currents therebetween are the charging current of the second electrostatic belt-type generator and the current between said hollow electrode and said second electrode through said gaseous medium, whereby said current is stabilized.

17. A neutron source comprising in combination: a first electrostatic belt-type generator including a hollow electrode on which electric charge is accumulated by operation of said first generator; a second electrode; an ionizable gaseous medium disposed between said hollow electrode and said second electrode; means for ionizing said ionizable medium wherein the energy for the necessary ionization is derived from a potential difference between said hollow electrode and said second electrode; a second electrostatic belt-type generator operating at substantially constant speed adapted to generate said potential difference between said electrodes; a target spaced from said hollow electrode; means to expose at least some of said ions to the accelerating electric field produced by the electric charge accumulated on said hollow electrode in such a manner that the ions so exposed are accelerated by said field onto said target; a corona discharge path between said hollow electrode and ground, whereby the potential of said hollow electrode is stabilized; and means for insulating said second electrode from said hollow electrode in such a way that the only appreciable currents therebetween are the charging current of the second electrostatic belt-type generator and the current between said hollow electrode and said second electrode through said gaseous medium whereby said current is stabilized.

18. A voltage generator comprising a source of mechanical power, a hollow electrode for the accumulation of electric charge, a supporting member of conductive material which is maintained at a fixed potential such as ground and which is spaced from said hollow electrode, a first pulley having a circumferential surface of insulating material rotatably supported on said supporting member, a second pulley having a circumferential surface of insulating material rotatably supported within said hollow electrode, an endless belt of insulating material supported on said pulleys so as to travel over the same in its movement, the insulating material of said endless belt being intermediate the insulating material of the circumferential surface of said second pulley and the insulating material of the circumferential surface of said first pulley in the triboelectric series, means to apply said mechanical power to the movement of said belt, a first set of corona points electrically connected to said supporting member and supported sufficiently close to said belt as it travels over said first pulley so as to initiate a corona discharge between said first set of corona points and said belt, whereby a first net electric charge appears on said belt as said belt travels between said first set of corona points and said first pulley, and a second set of corona points electrically connected to said hollow electrode and supported sufficiently close to said belt as it travels over said second pulley so as to initiate a corona discharge between said second set of corona points and said belt, whereby a second net electric charge opposite to said first net electric charge appears on said belt as said belt travels between said second set of corona points and said second pulley.

19. A voltage generator comprising a source of mechanical power, a hollow electrode for the accumulation of electric charge, a supporting member of conductive material which is maintained at a fixed potential such as ground and which is spaced from said hollow electrode, a first pulley having a circumferential surface of insulating material rotatably supported on said supporting member, a second pulley having a circumferential surface of insulating material rotatably supported within said hollow electrode, an endless belt of insulating material supported on said pulleys so as to travel over the same in its movement, the insulating material of said endless belt being substantially midway between the insulating material of the circumferential surface of said second pulley and the insulating material of the circumferential surface of said first pulley in the triboelectric series, means to apply said mechanical power to the movement of said belt, a first set of corona points electrically connected to said supporting member and supported sufficiently close to said belt as it travels over said first pulley so as to initiate a corona discharge between said first set of corona points and said belt, whereby a first net electric charge appears on said belt as said belt travels between said first set of corona points and said first pulley, and a second set of corona points electrically connected to said hollow electrode and supported sufficiently close to said belt as it travels over said second pulley so as to initiate a corona discharge between said second set of corona points and said belt, whereby a second net electric charge opposite to said first net electric charge appears on said belt as said belt travels between said second set of corona points and said second pulley.

20. An ion accelerator comprising in combination: a first electrostatic belt-type generator including a hollow electrode on which electric charge is accumulated by operation of said first generator; a source of ions wherein an ionizable gaseous medium is ionized by the passing of current therethrough; a second electrostatic belt-type generator operating at substantially constant speed adapted to generate said ionizing current; a target spaced from said source of ions; means to expose at least some of said ions to the accelerating electric field produced by the electric charge accumulated on said hollow electrode in such a manner that the ions so exposed are accelerated by said field onto said target; means for causing electric charge to leak off said hollow electrode in such a way that the leakage current so produced varies greatly with relatively slight variations in the potential of said hollow electrode, whereby the potential of said hollow electrode is stabilized; and means for insulating said second generator in such a way that the only appreciable currents between the terminals of said generator are its charging current and the current through said gaseous medium, whereby the current is stabilized.

21. Apparatus for accelerating a fixed number of ions per unit time to a fixed energy comprising in combination: means for electrically charging a hollow electrode to a high potential relative to ground, means for leaking a portion of the charge from said hollow electrode to ground through at least one corona discharge, means for passing constant current through an ionizable medium thereby producing ions at a constant rate therein, and means for causing a fixed portion of the ions so produced to enter the field of the potential between said hollow electrode and ground, whereby said ions may be accelerated through the fixed potential difference therebetween to a fixed energy.

References Cited in the file of this patent

UNITED STATES PATENTS

| Number | Name | Date |
|---|---|---|
| 2,489,436 | Salisbury | Nov. 29, 1949 |
| 2,647,554 | Grieshammer | Aug. 4, 1953 |
| 2,689,918 | Youmans | Sept. 21, 1954 |
| 2,763,609 | Lewis et al. | Sept. 18, 1956 |
| 2,769,096 | Frey | Oct. 30, 1956 |

OTHER REFERENCES

Larsen et al.: Modern Plastics, vol. 23, No. 7, pp. 160–194, March 1946.